US012563298B2

(12) United States Patent
Abe et al.

(10) Patent No.: US 12,563,298 B2
(45) Date of Patent: Feb. 24, 2026

(54) SHAKE CORRECTION DEVICE AND IMAGING APPARATUS

(71) Applicant: FUJIFILM Corporation, Tokyo (JP)

(72) Inventors: Takuro Abe, Saitama (JP); Kouhei Awazu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 70 days.

(21) Appl. No.: 18/611,665

(22) Filed: Mar. 20, 2024

(65) Prior Publication Data

US 2024/0323532 A1     Sep. 26, 2024

(30) Foreign Application Priority Data

Mar. 23, 2023    (JP) ................................. 2023-047258

(51) Int. Cl.
*H04N 23/68* (2023.01)
*H04N 23/52* (2023.01)

(52) U.S. Cl.
CPC ........... *H04N 23/687* (2023.01); *H04N 23/52* (2023.01); *H04N 23/6812* (2023.01)

(58) Field of Classification Search
CPC ... H04N 23/687; H04N 23/52; H04N 23/6812
See application file for complete search history.

(56) References Cited

U.S. PATENT DOCUMENTS

| | | | |
|---|---|---|---|
| 10,597,243 B2 * | 3/2020 | Hanamoto | ......... H04N 1/00557 |
| 11,397,305 B2 * | 7/2022 | Rendlen | ................. G02B 7/023 |
| 11,609,433 B2 * | 3/2023 | Ding | ....................... G06F 1/163 |
| 11,812,147 B2 | 11/2023 | Katsumata et al. | |
| 2006/0056829 A1 * | 3/2006 | Hirota | ................ H04N 23/6812 |
| | | | 396/54 |
| 2018/0288331 A1 * | 10/2018 | Kadowaki | .............. H04N 23/50 |
| 2021/0325683 A1 * | 10/2021 | Yee | .......................... G06F 3/015 |
| 2022/0038612 A1 * | 2/2022 | Yamane | ................. H04N 23/52 |
| 2022/0279126 A1 * | 9/2022 | Katsumata | ........... H04N 23/667 |
| 2023/0345095 A1 * | 10/2023 | Santos | ................... H04N 23/55 |

FOREIGN PATENT DOCUMENTS

JP          2022131324          9/2022

* cited by examiner

*Primary Examiner* — Chiawei Chen
(74) *Attorney, Agent, or Firm* — JCIPRNET

(57)          ABSTRACT

There are provided a shake correction device and an imaging apparatus capable of mechanically suppressing movement of a movable unit and efficiently radiating heat of the movable unit.
A shake correction device includes: a movable unit that holds an imaging element; a fixed unit that supports the movable unit to be movable within a plane that intersects an optical axis of the imaging element; and a lock mechanism that presses a first region of a first member connected to the fixed unit against a second member of the movable unit to suppress movement of the movable unit, in which heat of the movable unit is conducted to the fixed unit from a second region of the first member different from the first region via the first region from the second member by the pressing.

13 Claims, 17 Drawing Sheets

SHAKE CORRECTION DEVICE AND IMAGING APPARATUS

CROSS-REFERENCE TO RELATED APPLICATION

The present application claims priority under 35 U.S.C § 119(a) to Japanese Patent Application No. 2023-047258 filed on Mar. 23, 2023, which is hereby expressly incorporated by reference, in its entirety, into the present application.

BACKGROUND OF THE INVENTION

1. Field of the Invention

The present invention relates to a shake correction device and an imaging apparatus.

2. Description of the Related Art

In the related art, there has been proposed a technology of a camera (imaging apparatus) in which a shake correction device for suppressing a shake caused by a camera shake or the like is attached to an imaging element (image sensor).

For example, JP2022-131324A discloses a technology related to a shake correction device comprising a movable unit that holds an imaging element and is movable in a direction perpendicular to an optical axis, and a fixed unit that is composed of a front surface-side plate and a rear surface-side plate.

SUMMARY OF THE INVENTION

An embodiment according to a technique of the present disclosure is to provide a shake correction device and an imaging apparatus capable of mechanically suppressing movement of a movable unit and efficiently radiating heat of the movable unit.

According to a first aspect of the present invention, there is provided a shake correction device including: a movable unit that holds an imaging element; a fixed unit that supports the movable unit to be movable within a plane that intersects an optical axis of the imaging element; and a lock mechanism that presses a first region of a first member connected to the fixed unit against a second member of the movable unit to suppress movement of the movable unit, in which heat of the movable unit is conducted to the fixed unit from a second region of the first member different from the first region via the first region from the second member by the pressing.

According to a second aspect of the present invention, preferably, in the shake correction device according to the first aspect, each of the first region and the second region is a region of an end portion of the first member.

According to a third aspect of the present invention, preferably, in the shake correction device according to the first aspect, the heat of the movable unit is heat generated by an operation of the imaging element.

According to a fourth aspect of the present invention, preferably, in the shake correction device according to the first aspect, the first member is an elastically deformable member, and the first member is elastically deformed to press the second member in a case where the lock mechanism is operated.

According to a fifth aspect of the present invention, preferably, in the shake correction device according to the first aspect, the lock mechanism includes an operation member that has an inclined surface movable along a plane intersecting the optical axis, the first member has a protruding portion sliding on the inclined surface, and the protruding portion slides on the inclined surface to push up the first member, and the first region presses the second member.

According to a sixth aspect of the present invention, preferably, in the shake correction device according to the fifth aspect, the protruding portion protrudes in a direction along the optical axis.

According to a seventh aspect of the present invention, preferably, in the shake correction device according to the fifth or sixth aspect, the operation member is moved by a driving unit composed of a motor and a plurality of gears, and a part of the plurality of gears is composed of a worm wheel.

According to an eighth aspect of the present invention, preferably, in the shake correction device according to the first aspect, the lock mechanism locks the movable unit at a defined position.

According to a ninth aspect of the present invention, preferably, in the shake correction device according to the eighth aspect, the defined position is a position at which the second member is pressed in a state where an axis of an optical member and the optical axis are aligned with each other.

According to a tenth aspect of the present invention, preferably, in the shake correction device according to the first aspect, the movable unit is biased to a fixed unit side to grip at least three balls with the fixed unit via ball receiving surfaces, and a centroid of a force acting on the second member in a case where the second member is pressed is located within a triangular region formed by the ball receiving surfaces.

According to an eleventh aspect of the present invention, preferably, in the shake correction device according to the first aspect, an elastic member having a plurality of uneven shapes on a surface thereof is disposed in the first region, and the second member is pressed via the elastic member.

According to a twelfth aspect of the present invention, preferably, in the shake correction device according to the first aspect, an elastic member having a plurality of uneven shapes on a surface thereof is disposed in a region of the second member, which comes into contact with the first region, and the second member is pressed via the elastic member.

According to a thirteenth aspect of the present invention, preferably, in the shake correction device according to the first aspect, a heat radiation gel is disposed in at least a part of the first region.

An imaging apparatus according to a fourteenth aspect of the present invention is preferably equipped with the shake correction device according to the first aspect.

DESCRIPTION OF THE PREFERRED EMBODIMENTS

Hereinafter, preferred embodiments of a shake correction device and an imaging apparatus according to the present invention will be described with reference to the accompanying drawings.

Imaging Apparatus

First, an imaging apparatus 10 will be described. The imaging apparatus 10 of the present disclosure is equipped with a shake correction device 100 that suppresses an image shake in an image to be obtained, due to a shake such as a camera shake. The shake correction device 100 is a body image stabilization type (BIS).

Figure 1:
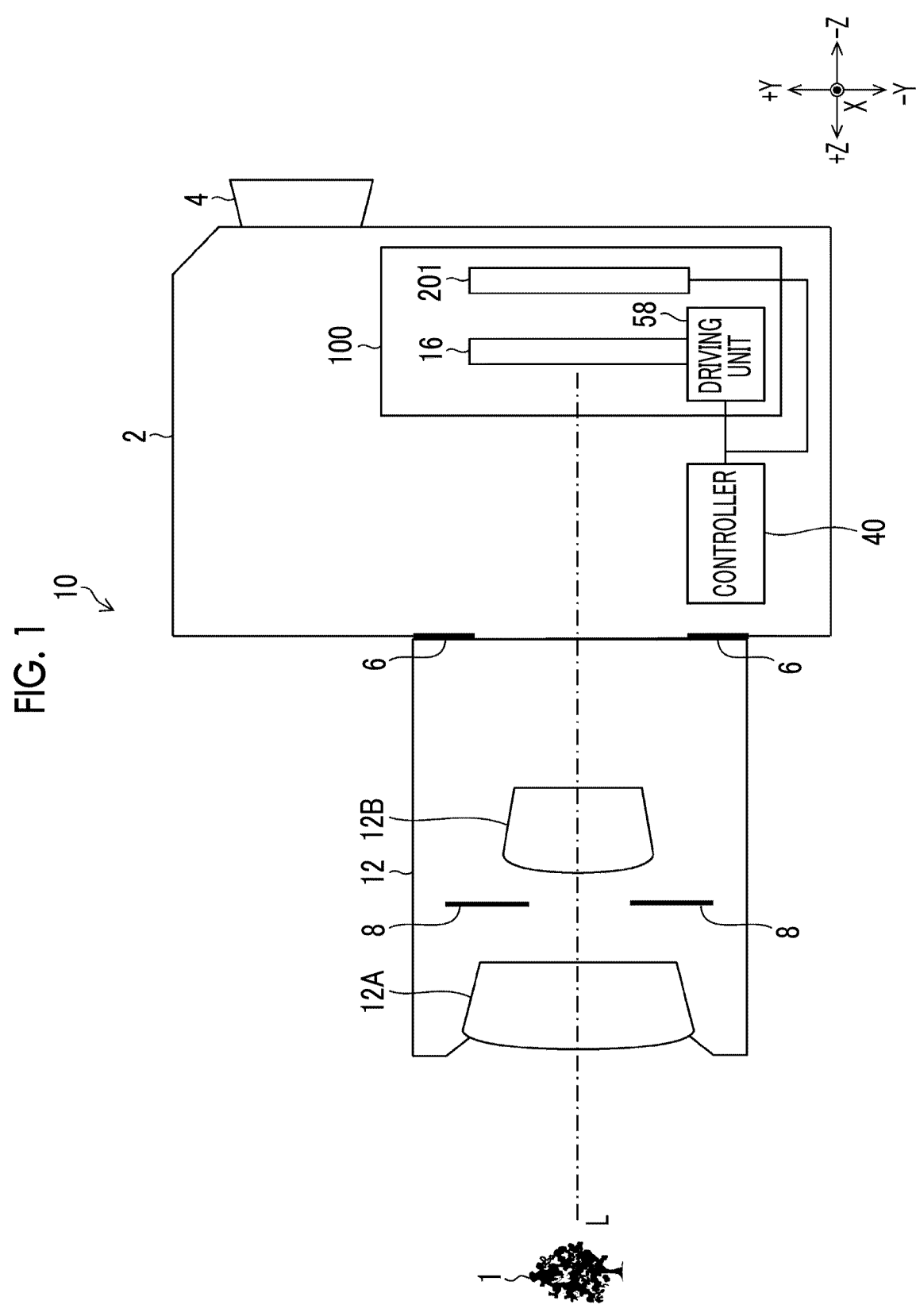
FIG. 1 is a schematic view of an inside of an imaging apparatus.

FIG. 1 is a schematic view of an inside of the imaging apparatus 10 that is equipped with the shake correction device 100 of the embodiment of the present invention.

The imaging apparatus 10 is a lens-interchangeable camera, and an imaging lens device 12 is mounted on an imaging apparatus main body 2 via an adapter 6. The imaging lens device 12 comprises a stop 8 and lens groups 12A and 12B. The imaging lens device 12 having an optical axis L forms an image of light reflected by a subject 1. The imaging apparatus main body 2 comprises an eyepiece portion 4, and an imager places his/her eye on the eyepiece portion 4 to image the subject 1 in a case of imaging the subject 1.

On an imaging element 16, a light-receiving surface (imaging surface) is disposed along a plane (X-Y plane) formed by two directions (X direction and Y direction) perpendicular to the optical axis L of the imaging apparatus main body 2. The imaging element 16 is held in the shake correction device 100. Further, a shake correction function is realized by a controller 40 controlling a driving unit 58 included in the shake correction device 100. Further, the shake correction device 100 includes a lock mechanism 201. For example, in a case where a power of the imaging apparatus 10 is turned off, the lock mechanism 201 operates to suppress movement of the imaging element 16. Accordingly, an impact caused by movement of the movable unit 101 is suppressed during transportation of the imaging apparatus 10 with the power turned off, and reliability can be improved. Further, the lock mechanism 201 locks the movable unit 101 (FIG. 5) holding the imaging element 16 at a defined position. Here, the defined position means a position where an axis of an optical member and an optical axis of the imaging element are aligned. The axis of the optical member is a central axis in inner diameters of the lens groups 12A and 12B or a central axis of the adapter 6 (body mount ring). In addition, the optical axis of the imaging element 16 is a central axis of a light-receiving surface of the imaging element 16. Therefore, in a case of a locked state, the lock mechanism 201 locks the movable unit 101 at a position where a central axis of the imaging element 16 and the axis of the optical member are aligned. Accordingly, by setting the lock mechanism 201 to the locked state while a live view image is reproduced, it is possible to reduce power of a voice coil motor for holding the imaging element 16 at the center (defined position), and to reduce battery consumption. The lock mechanism 201 is controlled by the controller 40. The controller 40 is connected to the imaging element 16 and the driving unit 58 through a flexible printed circuit (FPC) 135 (see FIG. 4), and transmits and receives electrical signals.

Figure 2:
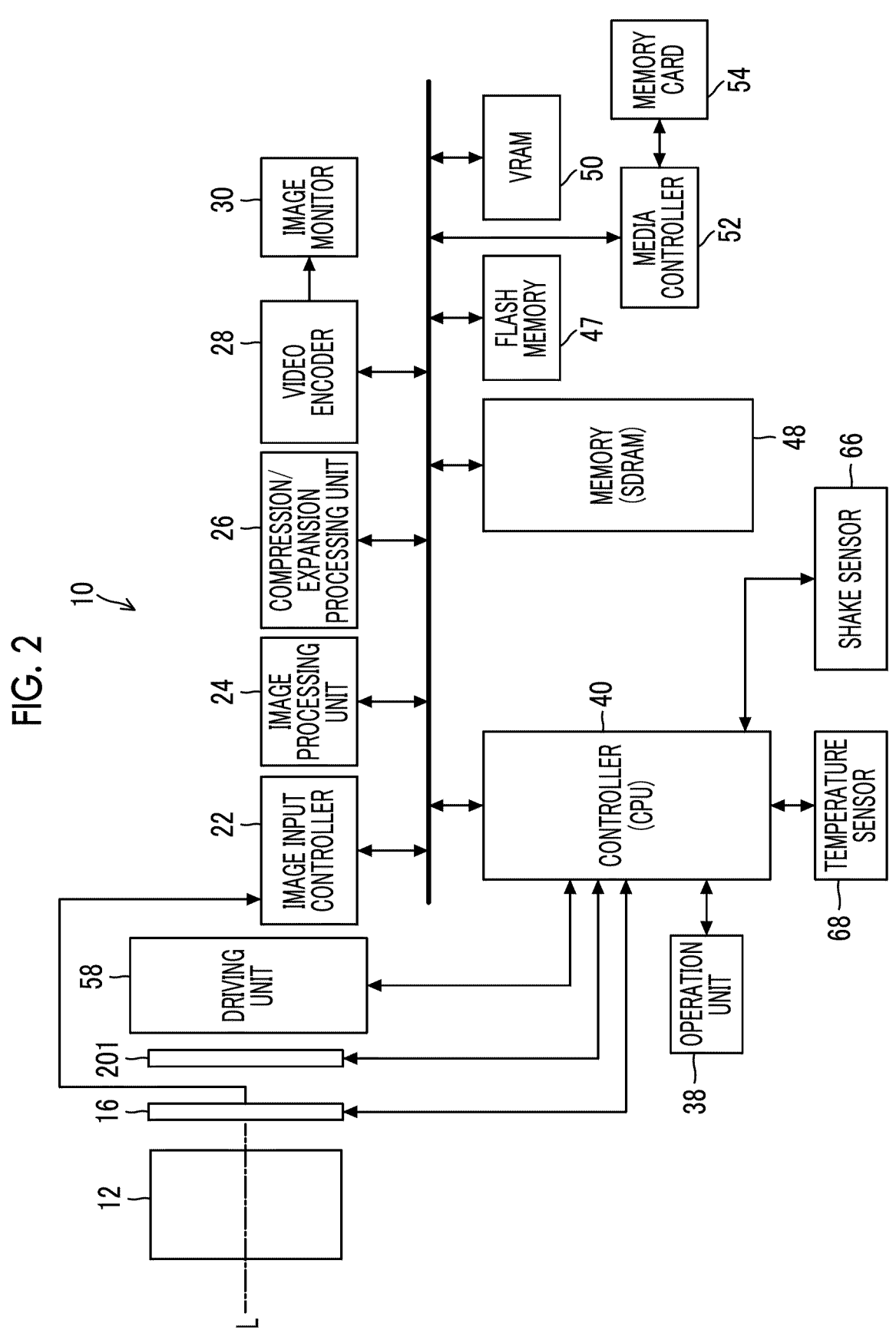
FIG. 2 is a block diagram showing an embodiment of an internal configuration of the imaging apparatus.

FIG. 2 is a block diagram showing an embodiment of an internal configuration of the imaging apparatus 10. The imaging apparatus 10 records a captured image in a memory card 54, and an operation of the entire apparatus is comprehensively controlled by the controller (central processing unit (CPU)) 40.

The imaging apparatus 10 is provided with an operation unit 38, such as a shutter button, a power/mode switch, a mode dial, and a cross operation button. A signal (command) from the operation unit 38 is input to the controller 40, and the controller 40 controls each circuit of the imaging apparatus 10 based on the input signal to perform drive control of the imaging element 16, lens drive control, stop drive control, imaging operation control, image processing control, recording/reproduction control of image data, display control of an image monitor 30, and the like.

A luminous flux that has passed through the imaging lens device 12 is imaged on the imaging element 16 which is a complementary metal-oxide semiconductor (CMOS) type color image sensor. The imaging element 16 is not limited to the CMOS type, and another type of image sensor, such as a charge coupled device (CCD) type or an organic imaging element, may be used.

In the imaging element 16, a large number of light-receiving elements (photodiodes) are two-dimensionally arranged, and a subject image formed on the light-receiving surface of each light-receiving element is converted (photoelectrically converted) into a signal voltage (or charge) of an amount corresponding to an amount of incidence ray, and is converted into a digital signal via an analog/digital (A/D) converter in the imaging element 16 to be output.

An image signal (image data) read from the imaging element 16 in a case of capturing a motion picture or a still picture is temporarily stored in a memory (synchronous dynamic random access memory (SDRAM)) 48 via an image input controller 22.

Further, a flash memory 47 stores various parameters used for a camera control program, image processing, and the like.

A shake sensor 66 detects posture information and posture change information of the imaging apparatus 10. The shake sensor 66 is configured of, for example, a gyro sensor. The shake sensor 66 is configured of, for example, two gyro sensors to detect a camera shake amount in a vertical direction and a camera shake amount in a horizontal direction, and the detected camera shake amount (angular velocity) is input to the controller 40. In addition, the shake sensor 66 includes hall sensors 166a to 166c (for example, FIG. 17) which will be described later. The controller 40 acquires a movement amount of the movable unit 101 by the hall sensors 166a to 166c, and controls the driving unit 58 according to the movement amount. That is, the controller 40 controls the driving unit 58 to move the imaging element 16 such that the movement of the subject image caused by a camera shake is canceled. Thus, the shake correction is performed in the shake correction device 100.

The driving unit 58 is configured of an actuator that moves the movable unit 101 by an electric signal (drive signal) from the controller 40. Specific examples of the actuator include a voice coil motor. The driving unit 58 moves the movable unit 101 on the X-Y plane perpendicular to the optical axis L in response to the electric signal input from the controller 40.

The lock mechanism 201 is controlled by the controller 40 and switches between the locked state and the unlocked state. In a case of the locked state, the movement of the movable unit 101 (FIG. 3) of the shake correction device 100 is suppressed, and in a case of the unlocked state, the movable unit 101 can freely move.

An image processing unit 24 reads unprocessed image data that is acquired via the image input controller 22 in case of capturing a motion picture or a still picture and temporarily stored in the memory 48. The image processing unit 24 performs offset processing, pixel interpolation processing (interpolation processing for a phase difference detecting pixel, a defective pixel, and the like), white balance correction, gain control processing including sensitivity correction, gamma-correction processing, synchronization processing (also called "demosaicing"), brightness and color difference signal generation processing, edge enhancement processing, color correction, and the like on the read image data. The image data that is processed by the image processing unit 24 and is processed as a live view image is input to a video random access memory (VRAM) 50.

The image data read from the VRAM 50 is encoded by a video encoder 28 and output to the image monitor 30 provided on a rear surface of the camera. Accordingly, the live view image showing the subject image is displayed on the image monitor 30.

The image data that is processed by the image processing unit 24 and is processed as a still picture or motion picture for recording (brightness data (Y) and color difference data (Cb), (Cr)) is stored again in the memory 48.

A compression/expansion processing unit 26 performs compression processing on the brightness data (Y) and the color difference data (Cb), (Cr) processed by the image processing unit 24 and stored in the memory 48 in a case of recording a still picture or a motion picture. The compressed image data is recorded in the memory card 54 via a media controller 52.

Further, the compression/expansion processing unit 26 performs expansion processing on the compressed image data obtained from the memory card 54 via the media controller 52 in a playback mode. The media controller 52 records and reads the compressed image data to and from the memory card 54.

In the above embodiment, a hardware structure of a processing unit (controller 40 or the like) that executes various kinds of processing includes various processors to be described below. The various processors include a central processing unit (CPU) that is a general-purpose processor functioning as various processing units by executing software (program), a programmable logic device (PLD) such as a field programmable gate array (FPGA) that is a processor having a circuit configuration changeable after manufacture, a dedicated electric circuit such as an application specific integrated circuit (ASIC) that is a processor having a circuit configuration dedicatedly designed to execute specific processing, and the like.

One processing unit may be configured of one of the various processors or may be configured of two or more processors of the same type or different types (for example, a plurality of FPGAs or a combination of a CPU and an FPGA). In addition, a plurality of processing units may be configured of one processor. As an example of configuring the plurality of processing units by one processor, first, there is a form in which one processor is configured of a combination of one or more CPUs and software, as typified by a computer such as a client or a server, and the one processor functions as the plurality of processing units. Second, there is a form in which a processor that realizes functions of an entire system including a plurality of processing units with one integrated circuit (IC) chip is used, as typified by a system on chip (SoC) or the like. As described above, the various processing units are configured using one or more of the above various processors as a hardware structure.

Further, as the hardware structure of the various processors, more specifically, an electric circuit (circuitry) in which circuit elements such as semiconductor elements are combined may be used.

Shake Correction Device

Figure 3:
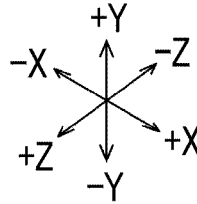
FIG. 3 is a perspective view of a shake correction device.
Figure 4:
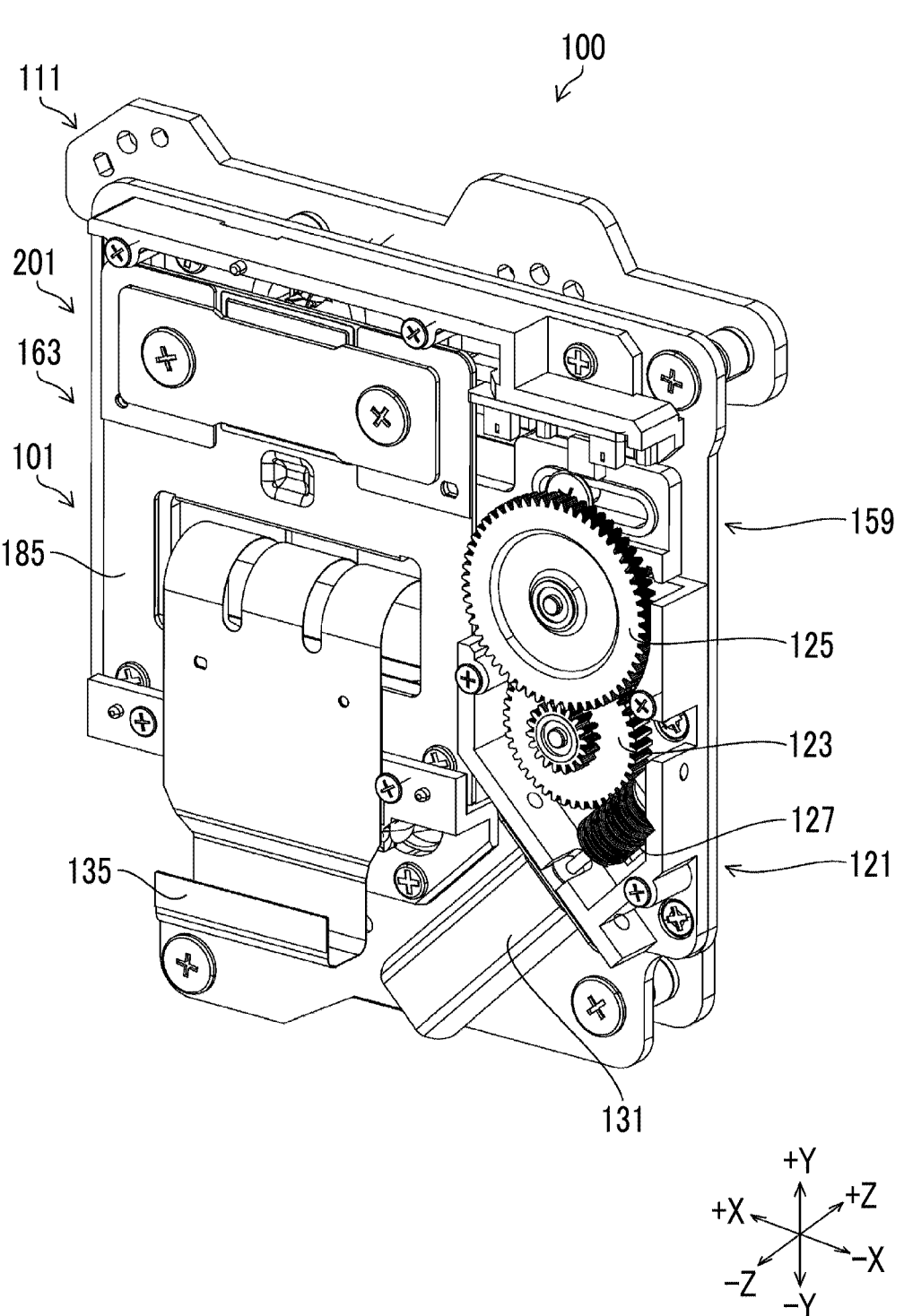
FIG. 4 is a perspective view of the shake correction device.

Next, the shake correction device 100 will be described. FIGS. 3 and 4 are perspective views of the shake correction device 100. FIG. 3 is a front perspective view, and FIG. 4 is a rear perspective view. In the following description, a front surface is a surface seen from a positive Z-axis side (subject side), and a rear surface is a surface seen from a negative Z-axis side (imager side). Further, a Z axis is parallel to the optical axis L (see FIGS. 1 and 2).

The shake correction device 100 is composed of a fixed unit 111 fixed to the imaging apparatus main body 2, the movable unit 101 holding the imaging element 16, and the lock mechanism 201 that mechanically suppresses the movement of the movable unit 101.

The fixed unit 111 is composed of a facing yoke 103 and a base plate 105. The base plate 105 and the facing yoke 103 are disposed to face each other and to be spaced from each other in a direction along the optical axis L. The movable unit 101 is disposed between the base plate 105 and the facing yoke 103. The fixed unit 111 supports the movable unit 101 to be movable within a plane (for example, an X-Y plane) intersecting the optical axis L of the imaging element 16.

The lock mechanism 201 suppresses the movement of the movable unit 101 by a mechanical method. The lock mechanism 201 is attached to a rear surface of the base plate 105 constituting the fixed unit 111.

Figure 10:
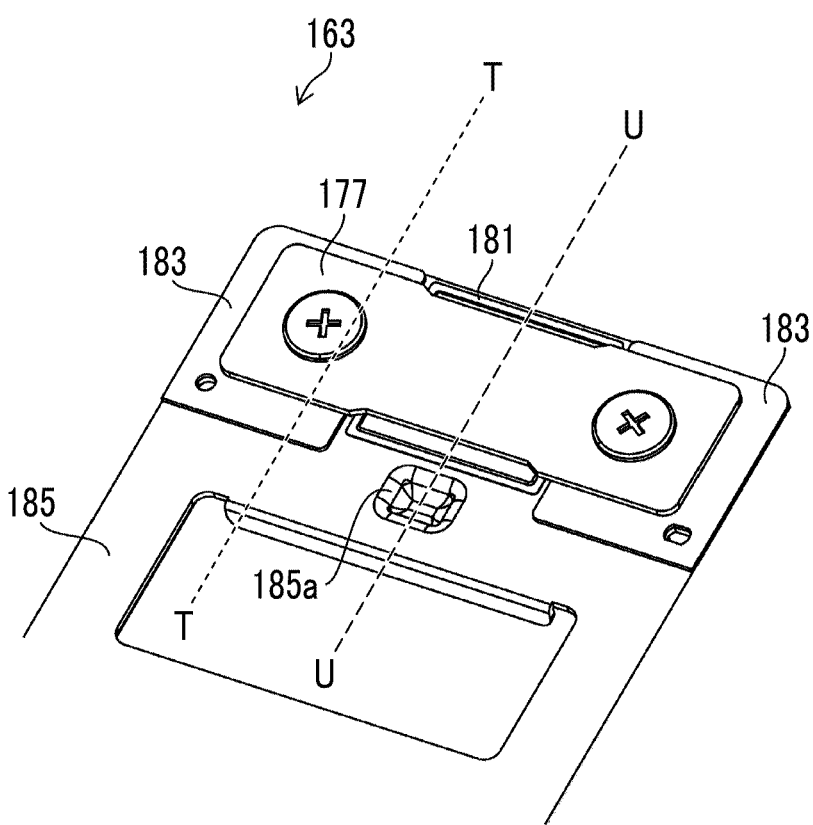
FIG. 10 is an enlarged perspective view of a region D in FIG. 8.

The lock mechanism 201 includes a lock driving unit 121, a lock operation unit 159 (see FIGS. 6 and 7), and a contact unit 163 (see FIG. 10).

The lock driving unit 121 is composed of a DC motor 131 and a plurality of gears.

The DC motor 131 is a specific example of the actuator and is a driving force source of the lock mechanism 201. The plurality of gears transmit a driving force of the DC motor 131 to the lock operation unit 159.

In the lock mechanism 201 of this example, a part of the lock driving unit 121 is composed of a plurality of gears composed of a screw gear (worm wheel) 127, a first gear 123, and a second gear 125. The plurality of gears constituting the lock driving unit 121 are not limited to the aspect of this example. Regarding the plurality of gears, various aspects can be employed as long as the driving force of the DC motor 131 can be transmitted to the lock operation unit 159.

Figure 6:
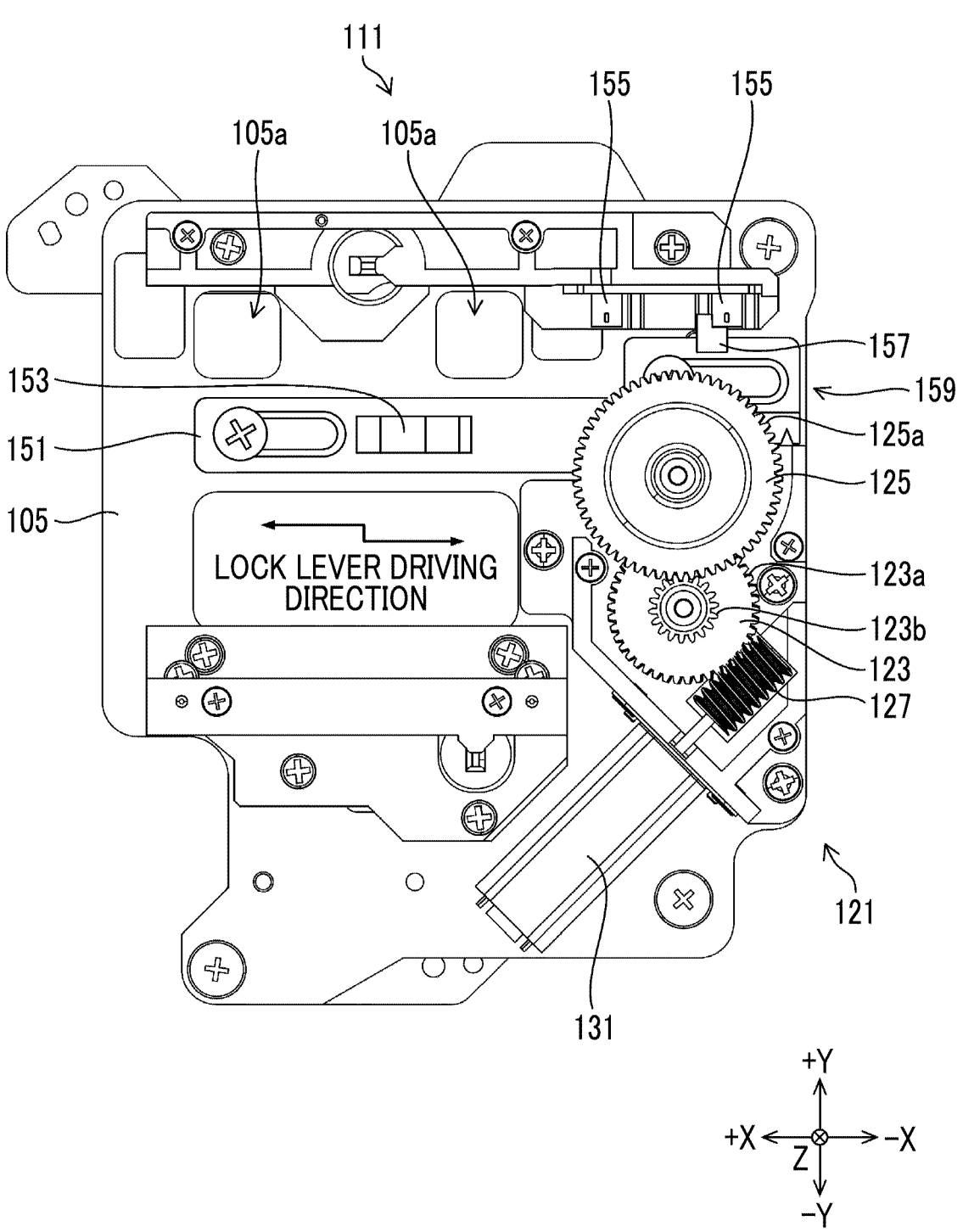
FIG. 6 is a view for explaining a lock driving unit and a lock operation unit.
Figure 7:
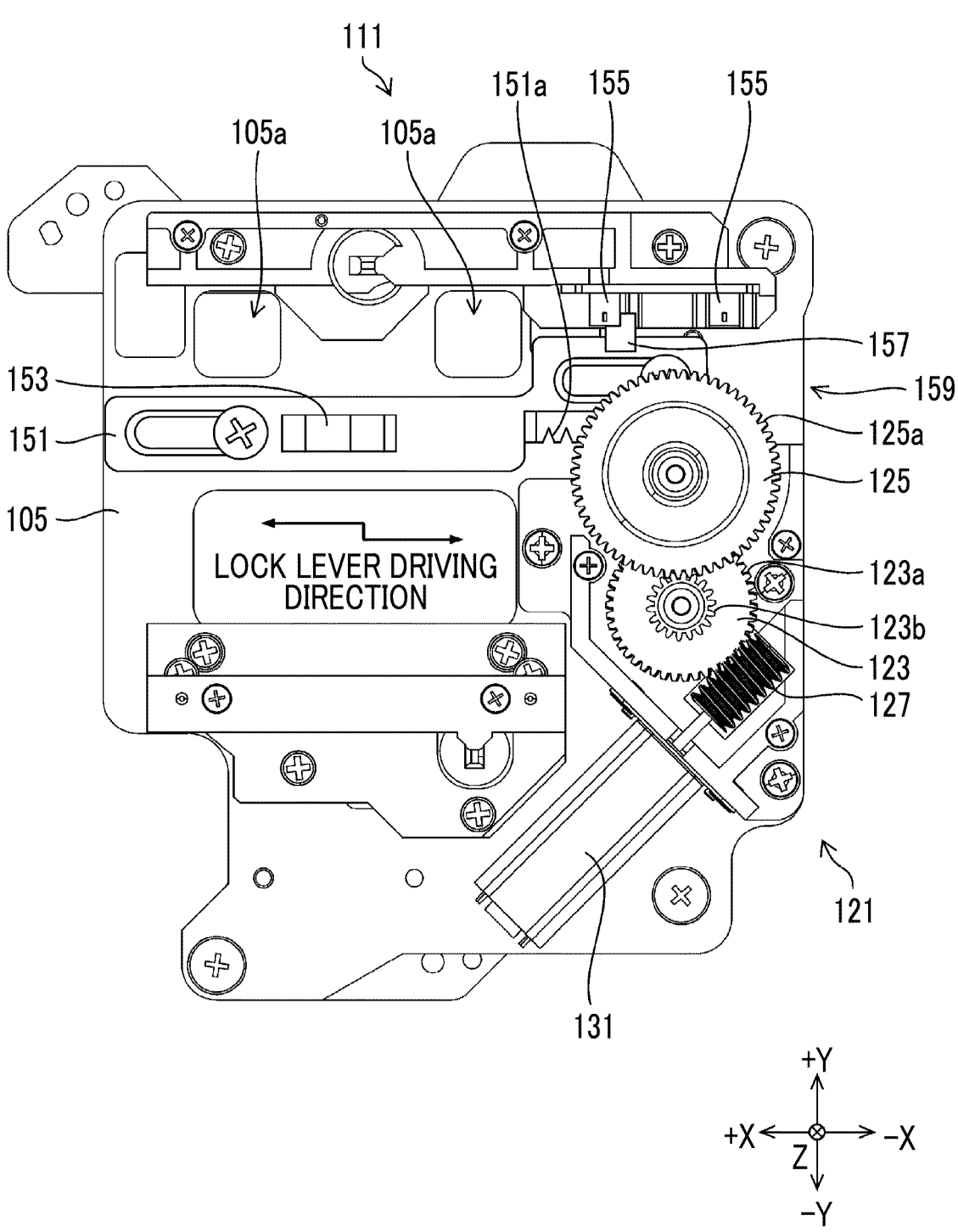
FIG. 7 is a view for explaining the lock driving unit and the lock operation unit.

The lock operation unit 159 is composed of a lock lever (operation member) 151 and a position detection sensor 155 (see FIGS. 6 and 7).

The contact unit 163 is composed of a fixed unit heat radiation sheet metal (first member) 185 and a movable unit heat radiation sheet metal (second member) 177 (see FIG. 10).

The movable unit 101 holds the imaging element 16. In addition, the movable unit 101 is supported by the fixed unit 111 and can freely move on the X-Y plane.

Figure 5:
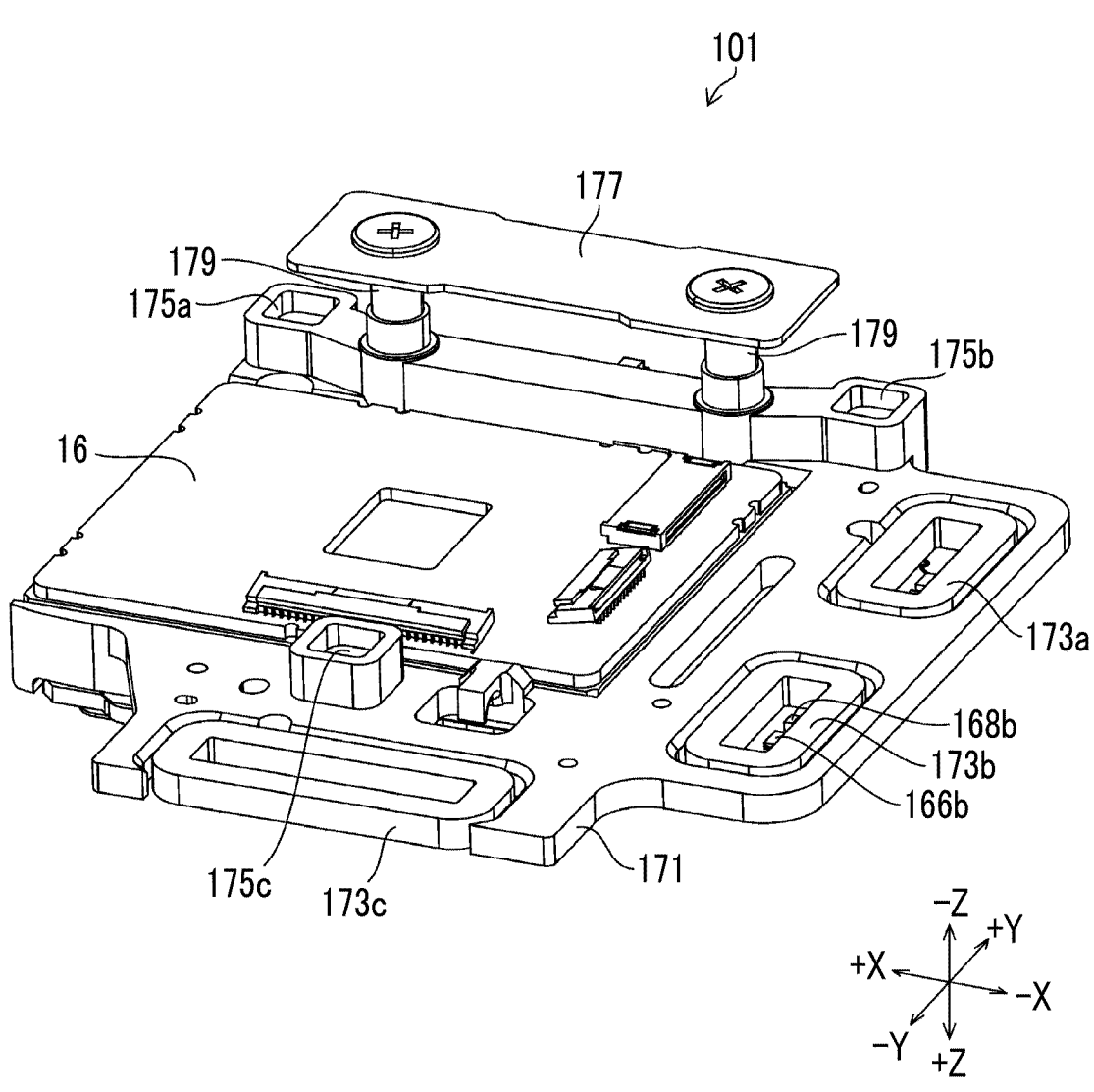
FIG. 5 is a perspective view of a movable unit.

FIG. 5 is a perspective view of the movable unit 101.

The movable unit 101 includes a movable unit frame member 171. The movable unit frame member 171 holds the imaging element 16 and the coils 173a to 173c. The coils 173a to 173c constitute a voice coil motor together with a magnet (not shown) disposed on the base plate 105 of the fixed unit 111. The voice coil motor is one of specific examples of the driving unit 58 (FIG. 1). In addition, hall elements 166a to 166c for position detection (see also FIG. 17) and thermistors 168a to 168c (see also FIG. 17) functioning as a temperature sensor 68 are disposed inside the coils 173a to 173c. In FIG. 5, only the hall element 166b and the thermistor 168b of the coil 173b are shown. The hall element 166a and the thermistor 168a of the coil 173a, and the hall element 166c and the thermistor 168c of the coil 173c are not shown. In the shake correction device 100, the imaging element 16 and the coils 173a to 173c serve as heat generation sources during operation. Accordingly, the lock mechanism 201 of the shake correction device 100 forms a heat radiation path Q through which the heat of the movable unit 101 is radiated to the fixed unit 111 while the movement of the movable unit 101 is suppressed (see FIG. 14). The heat radiation path Q formed in the lock mechanism 201 will be described later.

The movable unit frame member 171 includes a columnar protrusion 179 on an upper portion (Y-axis positive side). The protrusion 179 penetrates an opening 105a (see FIGS. 6 and 7) of the base plate 105, and holds the movable unit heat radiation sheet metal 177 on a rear surface side of the base plate 105 with the base plate 105 interposed therebetween. Further, the movable unit frame member 171 includes ball receiving surfaces 175a to 175c. The ball receiving surfaces 175a to 175c grip three balls (not shown) with the base plate 105 of the fixed unit 111. In addition, the movable unit frame member 171 is biased by an attractive force of a magnet (not shown) or an elastic force of a spring (not shown) with respect to the base plate 105. Then, the movable unit frame member 171 is able to move on the X-Y plane by rolling of the three balls between the movable unit frame member 171 and the base plate 105.

Lock Mechanism

Next, the lock mechanism 201 will be described in detail. The lock mechanism 201 will be described in the order of "1. Operations of lock driving unit 121 and lock operation unit 159", "2. Operation of contact unit 163", and "3. Formation of heat radiation path".

1. Operations of Lock Driving Unit and Lock Operation Unit

The lock driving unit 121 is composed of the DC motor 131 and the plurality of gears, and transmits the driving force of the DC motor 131 to the lock operation unit 159. The lock operation unit 159 is composed of the lock lever 151 and the position detection sensor 155, and performs a switching operation of contact/non-contact between the fixed unit heat radiation sheet metal 185 and the movable unit heat radiation sheet metal 177 at the contact unit 163.

FIGS. 6 and 7 are views for explaining the lock driving unit 121 and the lock operation unit 159. FIGS. 6 and 7 are rear views of the shake correction device 100, and show the lock driving unit 121 and the lock operation unit 159 provided on the rear surface of the base plate 105. In a case shown in FIG. 6, the lock lever 151 is moved to a right end (negative X side) and is in the unlocked state. On the other hand, in a case shown in FIG. 7, the lock lever 151 is moved to a left end (positive X side) and is in the locked state of the movable unit 101.

The screw gear 127 provided at a distal end of the DC motor 131 is rotated forward or backward by the DC motor 131. Due to the forward rotation or backward rotation of the DC motor 131, the lock mechanism 201 is switched between the locked state and the unlocked state.

The first gear 123 is a two-stage gear, and a bevel gear (worm wheel) 123a is provided in a first stage (large-diameter gear). The bevel gear 123a meshes with the screw gear 127, and the bevel gear 123a and the screw gear 127 form a worm gear. Here, as described below, since the drive of the lock lever 151 is performed via the worm gear, the locked state or the unlocked state is self-maintained after the switching operation between the locked state and the unlocked state is completed.

Further, a gear 123b of a second stage (small-diameter gear) of the first gear 123 meshes with a gear 125a of a first stage (large-diameter gear) of the second gear. Further, a gear (not shown) of a second stage (small-diameter gear: pinion) of the second gear meshes with a rack 151a formed on the lock lever 151. Accordingly, the gear of the second stage (small-diameter gear: pinion) of the second gear and the rack 151a form a rack-and-pinion, and a rotational force of the second gear 125 is converted into a linear movement parallel to an X axis of the lock lever 151. Accordingly, the lock lever 151 can move in a positive direction of the X axis (unlocked state: FIG. 6) and a negative direction of the X axis (locked state: FIG. 7) according to the forward rotation and backward rotation of the DC motor 131. The lock operation unit 159 is provided with the position detection sensor 155. The position detection sensor 155 detects a position of a mark portion 157 that is formed on the lock lever 151 and that moves together with the lock lever 151, thereby detecting a position of the lock lever 151.

In addition, a wedge-shaped portion 153 composed of an inclined surface that rises toward a Z-axis negative side is formed in the lock lever 151. The wedge-shaped portion 153 moves together with the movement of the lock lever 151. The wedge-shaped portion 153 pushes up the fixed unit heat radiation sheet metal 185 toward the imager side of the optical axis L and brings the fixed unit heat radiation sheet metal 185 into contact with the movable unit heat radiation sheet metal 177. In a case of the locked state, since friction holding is performed between the fixed unit heat radiation sheet metal 185 and the lock lever 151, it is desirable that the lock lever 151 is made of a resin molded component or the like. The reason for this is presumed to be that, in a case where the lock lever 151 is made of a metal, a contact between the lock lever 151 and the fixed unit heat radiation sheet metal 185 is a contact between metals, which may cause problems such as a decrease in a frictional force and dust generation due to sliding.

2. Operation of Contact Unit

The contact unit 163 is composed of the fixed unit heat radiation sheet metal 185 and the movable unit heat radiation sheet metal 177, and the movement of the movable unit 101 is suppressed by bringing the fixed unit heat radiation sheet metal 185 into contact with the movable unit heat radiation sheet metal 177.

Figure 8:
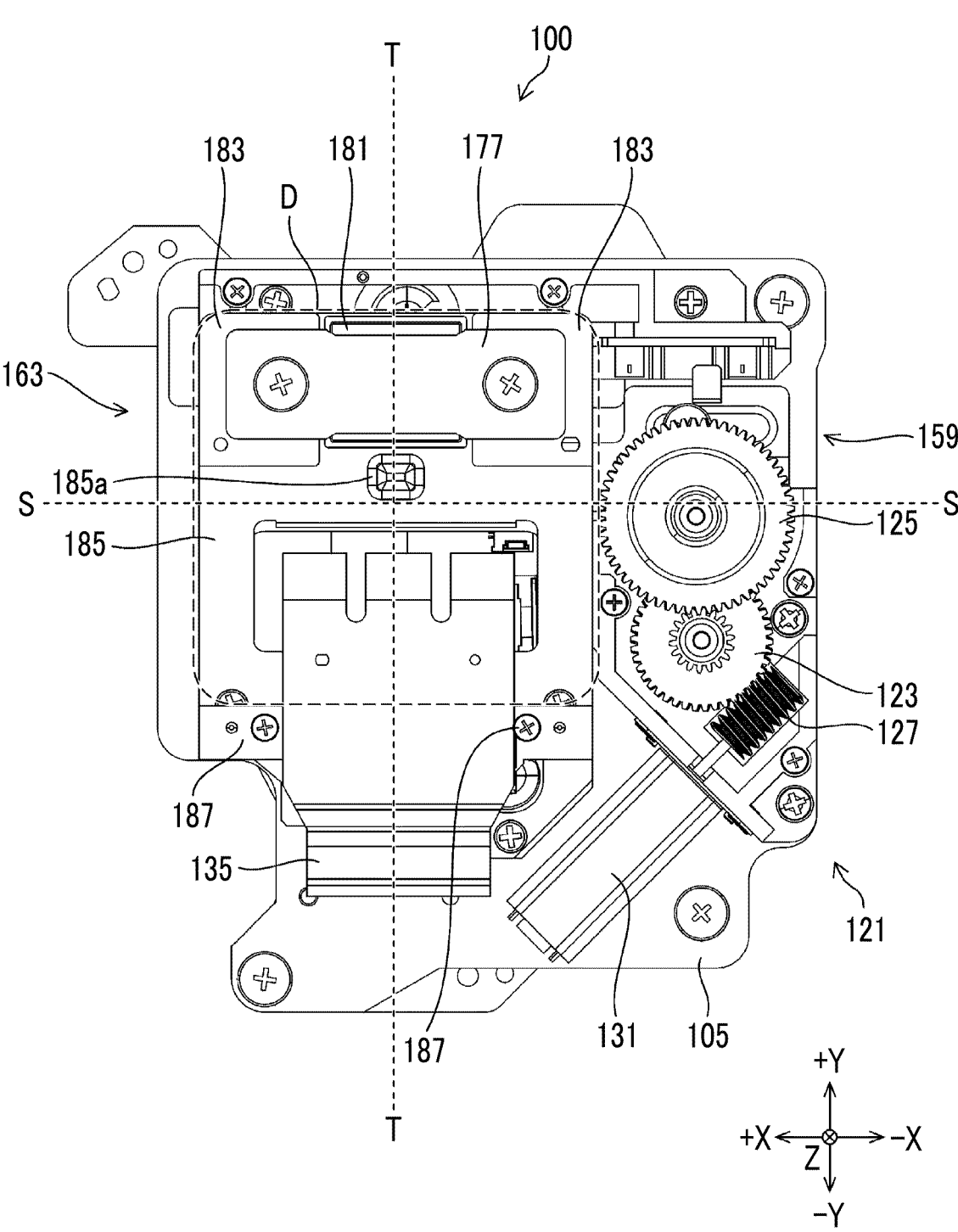
FIG. 8 is a rear view of the shake correction device.
Figure 9:
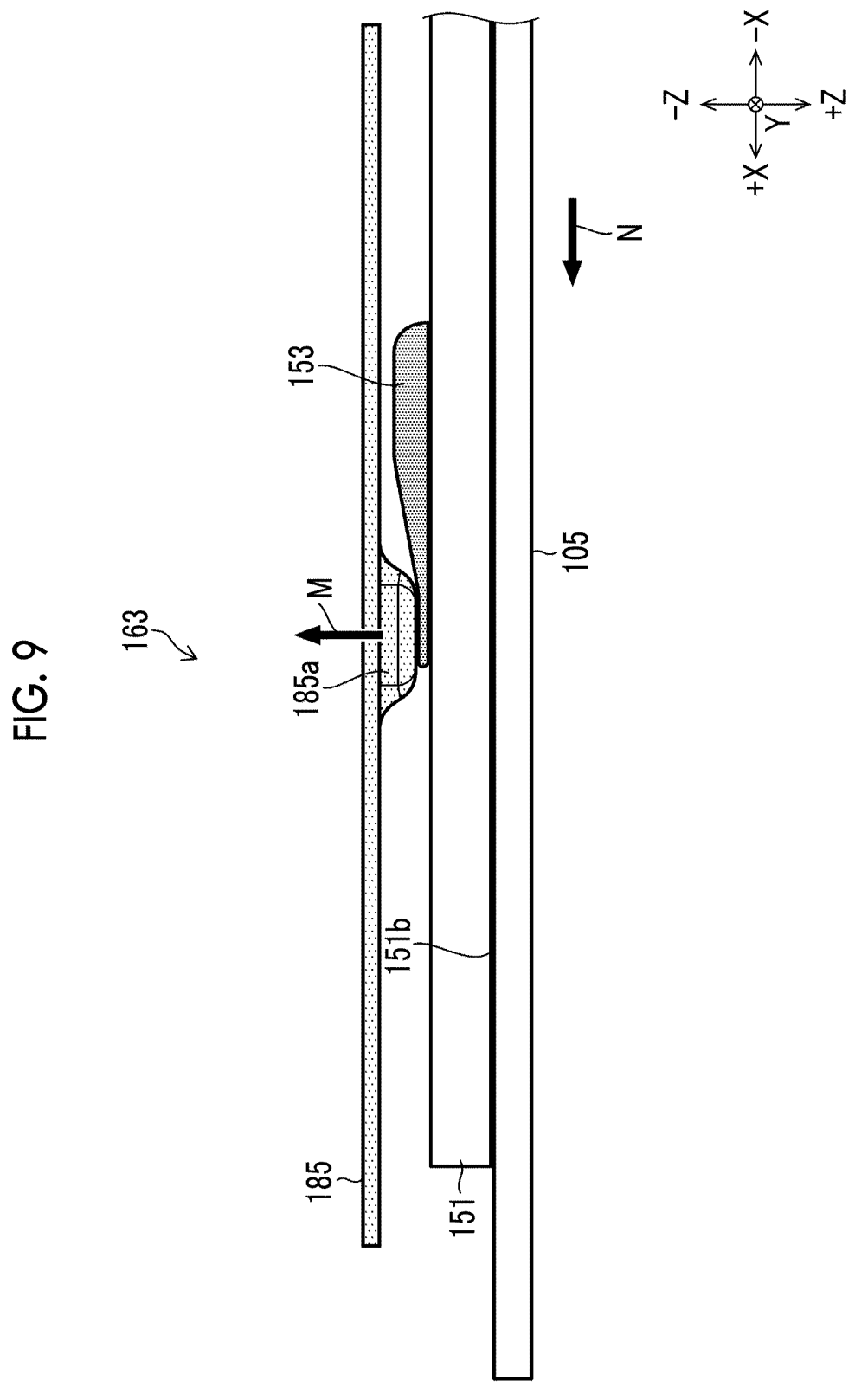
FIG. 9 is a view showing a part of a cross-sectional view taken along line S-S in FIG. 8.

FIGS. 8 and 9 are views for explaining the contact unit 163. FIG. 8 is a rear view of the shake correction device 100, and FIG. 9 is a view showing a part of a cross-sectional view taken along line S-S of FIG. 8. In FIG. 9, a contact portion between the fixed unit heat radiation sheet metal 185 and the wedge-shaped portion 153 of the lock lever 151 is mainly shown, and the other portions are not shown.

As shown in FIG. 9, the lock lever 151 is in contact with the base plate 105 via a sliding surface 151b. Therefore, the lock lever 151 can slide on a surface of the base plate 105 with less friction. The wedge-shaped portion 153 is provided on a surface of the lock lever 151 that is opposite to the sliding surface 151b. The lock lever 151 is moved in a direction (X axis) orthogonal to the optical axis L by a driving force obtained via the rack 151a (see FIG. 7). In a case of the locked state, the lock lever 151 is moved in a direction of an arrow N and the wedge-shaped portion 153 is also moved in the direction of the arrow N. The fixed unit heat radiation sheet metal 185 is provided with a protruding portion 185a that protrudes toward the wedge-shaped portion 153 along the optical axis L (Z axis) so as to correspond to the wedge-shaped portion 153. The protruding portion 185a slides on the inclined surface of the wedge-shaped portion 153. In a case where the wedge-shaped portion 153 is moved in the direction of the arrow N, the protruding portion 185a provided on the fixed unit heat radiation sheet metal 185 slides up the wedge-shaped portion 153, and the fixed unit heat radiation sheet metal 185 is pushed up in a direction of an arrow M. In this way, in a case where the fixed unit heat radiation sheet metal 185 is pushed up in the direction of the arrow M, the fixed unit heat radiation sheet metal 185 presses the movable unit heat radiation sheet metal 177 (see FIGS. 11A and 11B), and the movement of the movable unit 101 is suppressed.

Next, the pressing of the movable unit heat radiation sheet metal 177 by the fixed unit heat radiation sheet metal 185 will be described in detail.

Figure 11B:
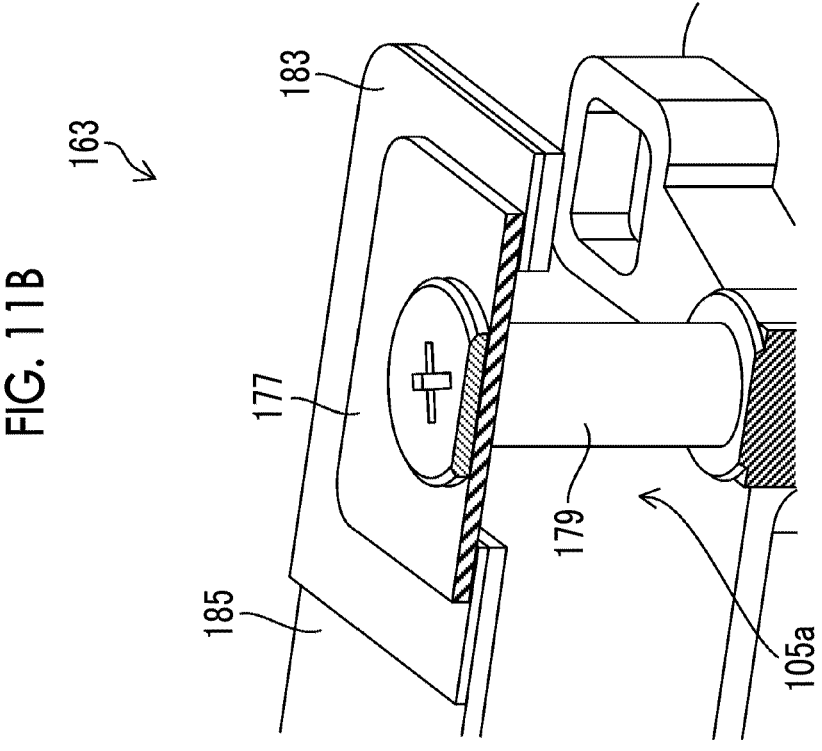
FIGS. 11A and 11B are views showing a T-T cross section in FIG. 10.
Figure 11A:
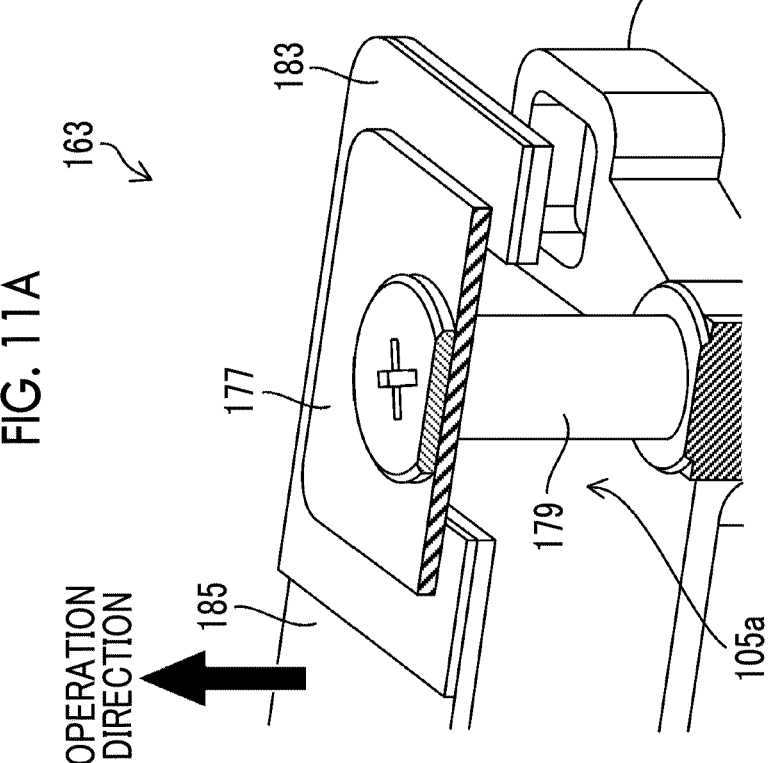

FIG. 10 is an enlarged perspective view of a region D in FIG. 8. In addition, FIGS. 11A and 11B are views showing a T-T cross section in FIG. 10. FIG. 11A is a view showing the unlocked state, and FIG. 11B is a view showing the locked state.

The fixed unit heat radiation sheet metal 185 includes the opening 105a through which the protrusion 179 of the movable unit frame member 171 penetrates (see FIGS. 6 and 7). Further, a sheet member 183 having a friction holding function is stuck around the opening 105a of the fixed unit heat radiation sheet metal 185. In the unlocked state shown in FIG. 11A, a sufficient clearance is secured between the movable unit heat radiation sheet metal 177 and the sheet member 183, and the movable unit 101 can be freely moved, so that shake correction can be performed. On the other hand, in the locked state shown in FIG. 11B, since the fixed unit heat radiation sheet metal 185 is pushed up by the wedge-shaped portion 153 of the lock lever 151, the fixed unit heat radiation sheet metal 185 presses the movable unit heat radiation sheet metal 177 via the sheet member 183. Here, the sheet member 183 will be described. Since the movable unit heat radiation sheet metal 177 is fastened to the movable unit 101, a force corresponding to an inertial force caused by a weight or a change in acceleration of the movable unit 101 acts. Since the sheet member 183 and the movable unit heat radiation sheet metal 177 are held by a frictional force therebetween in the locked state, it is desirable to use a material having a large surface frictional force for the sheet member 183. Meanwhile, since a lock accuracy is lowered by a shear deformation of the sheet member 183, it is desirable that a material having a high lateral elastic modulus is used for the sheet member 183 and it is desirable that a thickness of the sheet member 183 is small.

The sheet member 183 of this example has a thickness of 0.2 mm and uses a rubber material, and a plurality of dot-like fine shapes are provided on the surface of the sheet member 183 in order to improve shape followability. Accordingly, a holding force of the movable unit 101 is improved. The sheet member 183 is desirably made of an elastic member from the viewpoint of absorbing a contact impact between the fixed unit heat radiation sheet metal 185 and the movable unit heat radiation sheet metal 177. In addition, it is desirable that the sheet member 183 has a plurality of uneven shapes or dot-like fine shapes on the surface thereof from the viewpoint of shape followability in a case where the fixed unit heat radiation sheet metal 185 and the movable unit heat radiation sheet metal 177 are in contact with each other. In the described example, an example in which the sheet member 183 is disposed on the fixed unit heat radiation sheet metal 185 side has been described, but the present invention is not limited to this example. For example, the sheet member 183 may be disposed in a region of the movable unit heat radiation sheet metal 177 that comes into contact with the fixed unit heat radiation sheet metal 185.

Switching between the locked state and the unlocked state is performed by a control signal from the controller 40 (see FIG. 2). As one of specific examples of the locked state, in a case where the power of the imaging apparatus 10 is turned off, the lock mechanism 201 is operated to be in the locked state. Further, for example, in a case where an operation on a user interface provided in the imaging apparatus 10 is detected, the lock mechanism 201 is operated to be in the locked state. Further, for example, in a case where the acceleration is detected by an acceleration sensor constituting the shake sensor 66 (see FIG. 2), and imaging with a tripod is determined by the controller 40, the lock mechanism 201 is operated to be in the locked state.

As described above, in the shake correction device 100, the fixed unit heat radiation sheet metal 185 presses the movable unit heat radiation sheet metal 177, so that the movement of the movable unit 101 is suppressed. In addition, since the sheet member 183 is disposed in a region where the movable unit heat radiation sheet metal 177 and the fixed unit heat radiation sheet metal 185 come into contact with each other, friction can be further held and a lock function of the movable unit 101 can be improved.

3. Formation of Heat Radiation Path

Next, the formation of the heat radiation path will be described. In a case where the fixed unit heat radiation sheet metal 185 presses the movable unit heat radiation sheet metal 177, the heat radiation path Q through which the heat of the movable unit 101 is transferred to the fixed unit 111 is formed.

Figure 12B:
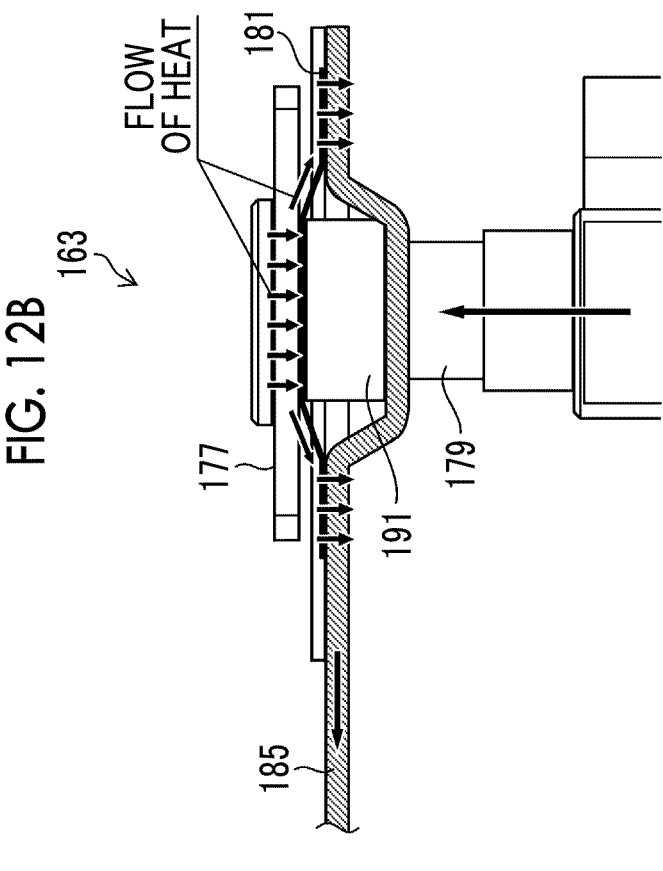
FIGS. 12A and 12B are views showing a U-U cross section in FIG. 10.
Figure 12A:
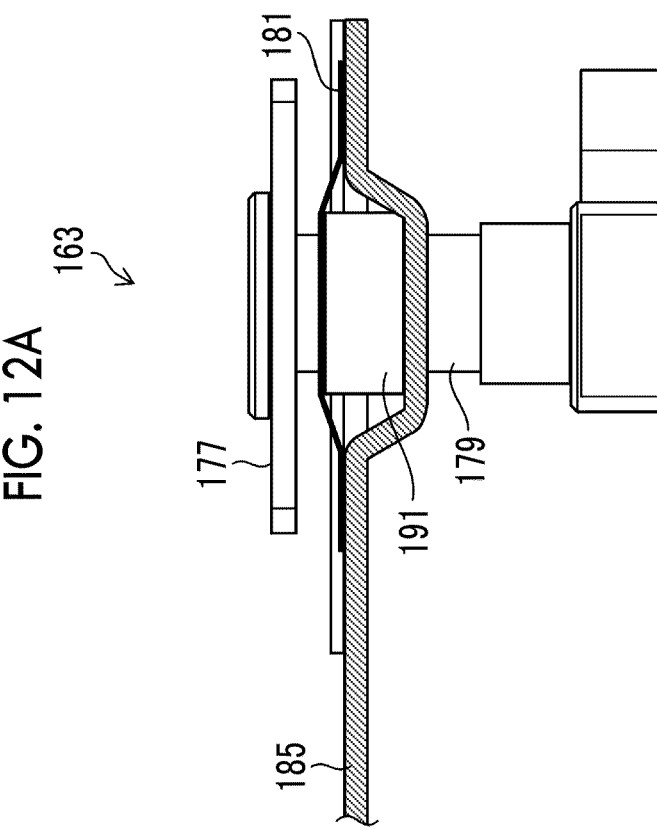

FIGS. 12A and 12B are views for explaining thermal conduction in the contact unit 163, and are views showing a U-U cross section in FIG. 10. FIG. 12A is a view showing the unlocked state at the contact unit 163, and FIG. 12B is a view showing a transition to the locked state at the contact unit 163.

A cushion 191 is disposed on the fixed unit heat radiation sheet metal 185, and the cushion 191 absorbs an impact in a case where the fixed unit heat radiation sheet metal 185 and the movable unit heat radiation sheet metal 177 come into contact with each other. The cushion 191 is disposed in a recessed portion of the fixed unit heat radiation sheet metal 185, and the graphite sheet 181 is adhered to the cushion 191 from above so that the cushion 191 is elastically biased to the fixed unit heat radiation sheet metal 185.

As shown in FIG. 12A, the graphite sheet 181 has a protruding shape corresponding to a height of the cushion 191, but the graphite sheet 181 and the movable unit heat radiation sheet metal 177 do not come into contact with each other in the unlocked state. On the other hand, as shown in FIG. 12B, in a transition stage to the locked state, a portion of the movable unit heat radiation sheet metal 177, which corresponds to the cushion 191, comes into contact with the graphite sheet 181 earlier than other portions of the movable unit heat radiation sheet metal 177. Here, since the cushion 191 elastically follows the shape of the movable unit heat radiation sheet metal 177, a contact area between the graphite sheet 181 and the movable unit heat radiation sheet metal 177 can be increased. Accordingly, thermal resistance between the movable unit heat radiation sheet metal 177 and the graphite sheet 181 can be lowered, and the heat of the movable unit 101 can be radiated to the fixed unit 111 more efficiently.

Here, as described above, a contacting portion of the graphite sheet 181 on which the cushion 191 is provided protrudes toward the movable unit heat radiation sheet metal 177 side with respect to other portions. Accordingly, it is possible to prevent damage to the graphite sheet 181 in a case where a force equal to or larger than a lock holding force acts on the movable unit 101 and the graphite sheet 181 deviates from a holding position. Practically, the graphite sheet 181 needs to be sealed with a thin PET film as a measure against dust generation, and it is necessary to avoid contact with an edge of the movable unit heat radiation sheet metal 177.

Figure 13B:
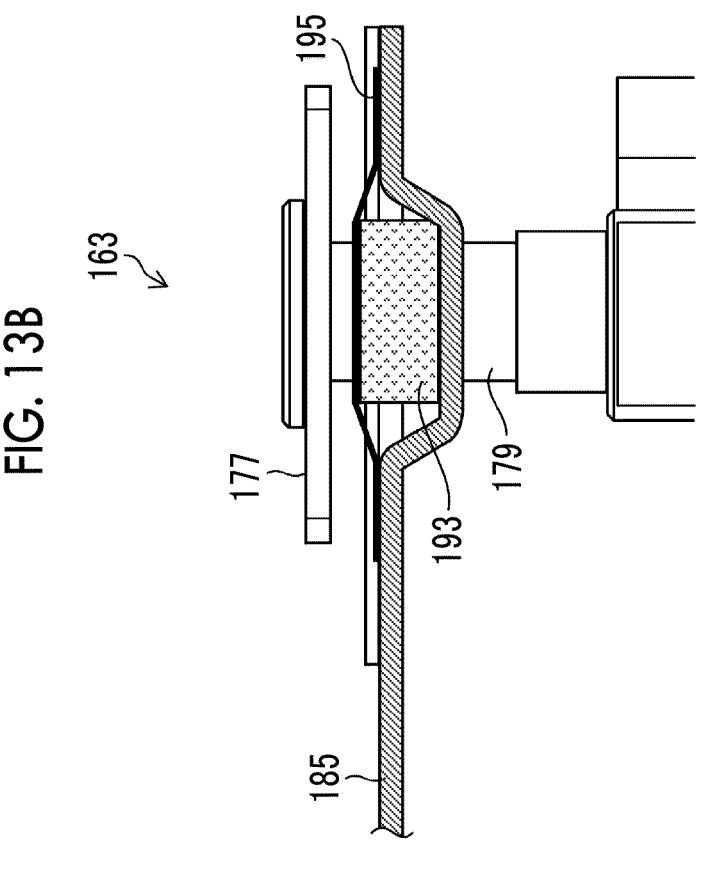
FIGS. 13A and 13B are views showing modification examples of a configuration of a contact unit.
Figure 13A:
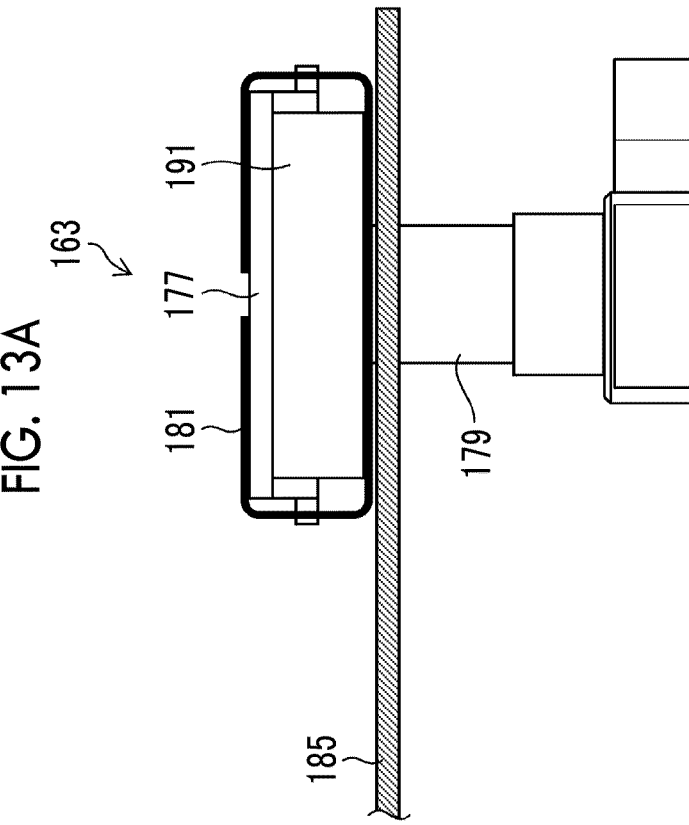

FIGS. 13A and 13B are views showing modification examples of a configuration of the contact unit 163.

FIG. 13A is a view showing a modification example related to an attachment position of the cushion 191. In the example described with reference to FIGS. 12A and 12B, the cushion 191 is disposed in the recessed portion of the fixed unit heat radiation sheet metal 185. However, the cushion 191 may be disposed on the movable unit heat radiation sheet metal 177 as shown in FIG. 13A. In this case, the graphite sheet 181 is also provided on the movable unit heat radiation sheet metal 177 side. Specifically, a cushion 191 is provided on a side of the movable unit heat radiation sheet metal 177 that comes into contact with the fixed unit heat radiation sheet metal 185. Then, the graphite sheet 181 is disposed so as to wrap the cushion 191 and the movable unit heat radiation sheet metal 177.

FIG. 13B is a view showing a modification example in which a heat radiation gel 193 is disposed instead of the cushion 191. As shown in FIG. 13B, by disposing the heat radiation gel 193 instead of the cushion 191, the heat of the movable unit heat radiation sheet metal 177 can be efficiently absorbed. Since the heat radiation gel 193 has low durability and a contact surface on the surface of the heat radiation gel 193 deteriorates due to repeated contact with the movable unit heat radiation sheet metal 177, it is desirable to take measures, such as covering the heat radiation gel 193 with a protective film 195.

Figure 14:
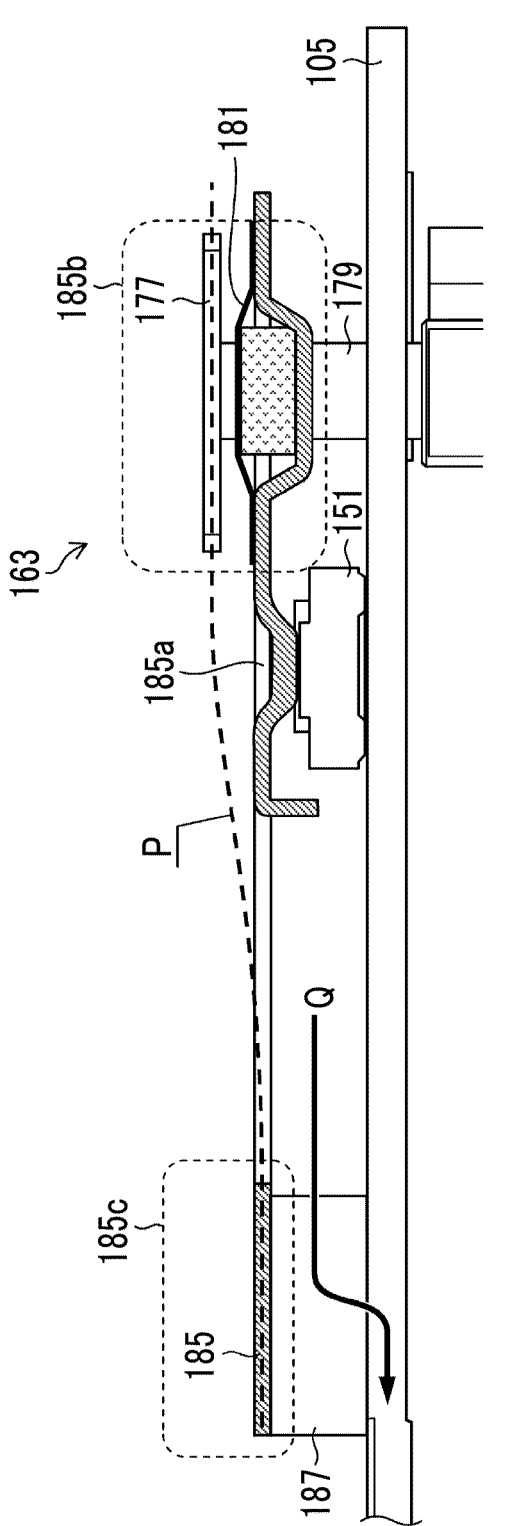
FIG. 14 is a view for explaining a heat radiation path formed in the shake correction device.

FIG. 14 is a view for explaining the heat radiation path Q formed in the shake correction device 100.

In FIG. 14, a shape of the fixed unit heat radiation sheet metal 185 pushed up by the lock lever 151 is indicated by a dotted line P. The fixed unit heat radiation sheet metal 185 is made of an elastically deformable member, and is pushed up by the lock lever 151 as in the shape indicated by the dotted line P. Since the protruding portion 185a is provided away from a sheet metal fixing portion 187, a first region 185b, which is an end portion of the fixed unit heat radiation sheet metal 185, can be displaced in a direction substantially perpendicular to the imaging surface (X-Y plane) due to elastic deformation. That is, the first region 185b of the fixed unit heat radiation sheet metal 185 is displaced in a direction substantially perpendicular to the imaging surface to press the movable unit heat radiation sheet metal 177. As described above, the first region 185b of the fixed unit heat radiation sheet metal 185 presses the movable unit heat radiation sheet metal 177 so that the movement of the movable unit 101 can be suppressed. In addition, in a case where the fixed unit heat radiation sheet metal 185 is in contact with the movable unit heat radiation sheet metal 177, the movable unit heat radiation sheet metal 177 and the fixed unit heat radiation sheet metal 185 contact with each other in a large area (first region 185b). Accordingly, the heat of the movable unit heat radiation sheet metal 177 can be efficiently transferred to the fixed unit heat radiation sheet metal 185. In addition, since the fixed unit heat radiation sheet metal 185 is fixed at a second region 185c of the end portion, the heat of the fixed unit heat radiation sheet metal 185 can be efficiently transferred to the base plate 105.

Here, in the imaging apparatus having a shake correction function in the related art, shake correction is performed by moving the movable unit. Therefore, in a case of radiating heat from the movable unit to the fixed unit, it is necessary to radiate the heat over a long path using a thin graphite sheet, and the thermal resistance increases. For this reason, under a condition that imposes a load on the imaging apparatus, such as motion picture capturing at a high frame rate or long-time imaging, the heat radiation of the imaging element cannot keep up, and a continuous recording time is limited. Further, in the imaging apparatus having a shake correction function in the related art, a plurality of movable portions are included in the heat radiation path, and a heat radiation efficiency is not good.

However, in the heat radiation path Q of the shake correction device 100 of the present disclosure described above, the contact unit 163 is made of a heat radiation sheet metal, only the contact unit 163 is a movable portion, and the other portions are fixed portions. Therefore, it is possible to efficiently radiate the heat of the movable unit 101 with higher thermal conduction. Accordingly, in the imaging apparatus 10 equipped with the shake correction device 100, by operating the lock function between continuous imaging operations, the heat of the imaging element 16 can be efficiently radiated in preparation for the next imaging.

Figure 15:
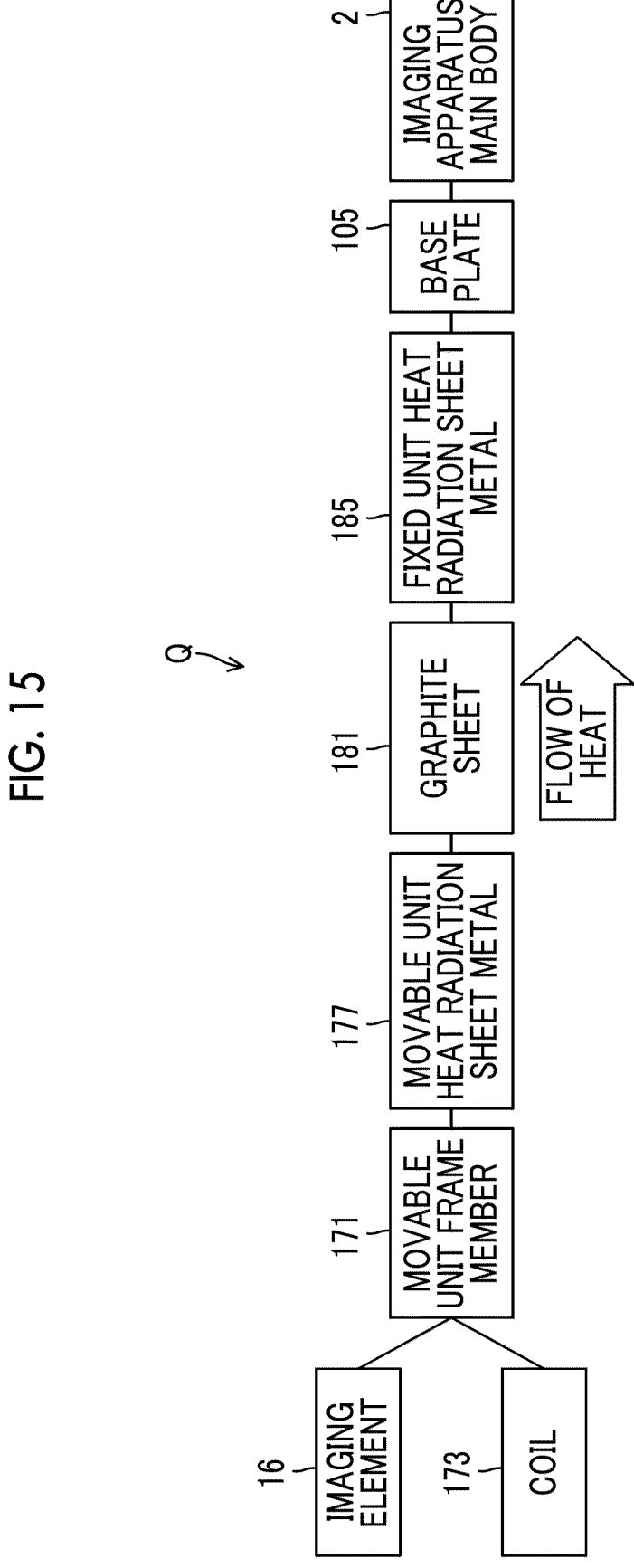
FIG. 15 is a view for explaining the heat radiation path of the shake correction device.

FIG. 15 is a view for explaining the heat radiation path Q of the shake correction device 100.

In the shake correction device 100, the imaging element 16 and the coil 173 (referred to as the coil 173 as a representative of the coils 173a to 173c) are the heat generation sources. Such heat is transferred to the movable unit frame member 171 and the movable unit heat radiation sheet metal 177.

The lock mechanism 201 is operated, and the fixed unit heat radiation sheet metal 185 presses the movable unit heat radiation sheet metal 177. As a result, the movable unit heat radiation sheet metal 177 and the fixed unit heat radiation sheet metal 185 are brought into contact with each other to form a heat path, and the heat of the movable unit heat radiation sheet metal 177 is transferred to the fixed unit heat radiation sheet metal 185 via the graphite sheet 181 and is transferred to the base plate 105 of the fixed unit 111. The base plate 105 is attached to the imaging apparatus main body 2, and the heat of the base plate 105 is also transferred to the imaging apparatus main body 2. In this way, in the heat radiation path Q of the shake correction device 100, the contact unit 163 is made of a heat radiation sheet metal, only the contact unit 163 is a movable portion, and the other portions are fixed portions. Therefore, the heat generated in the imaging element 16 or the coil 173 can be efficiently radiated to the imaging apparatus main body 2.

As described above, in the shake correction device 100, in a case where the movable unit heat radiation sheet metal 177 is pressed by the fixed unit heat radiation sheet metal 185, the heat radiation path Q is formed. Accordingly, the heat generated from the imaging element 16 or the coil 173 as a heat generation source can be radiated from the movable unit 101 to the fixed unit 111.

Disposition of Protrusion

Next, the protrusion 179 formed on the movable unit frame member 171 will be described.

Figure 16:
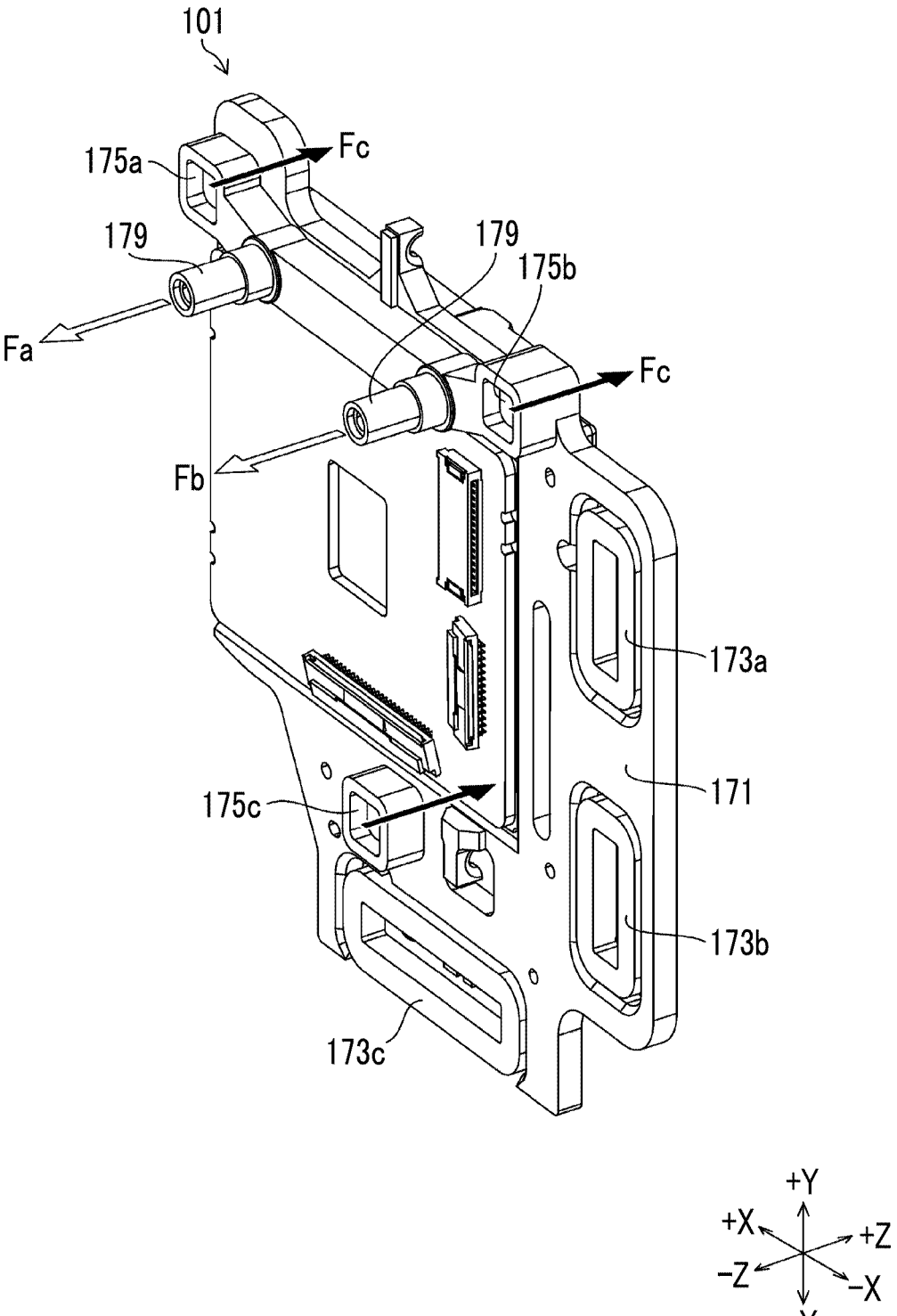
FIG. 16 is a rear perspective view of the movable unit.
Figure 17:
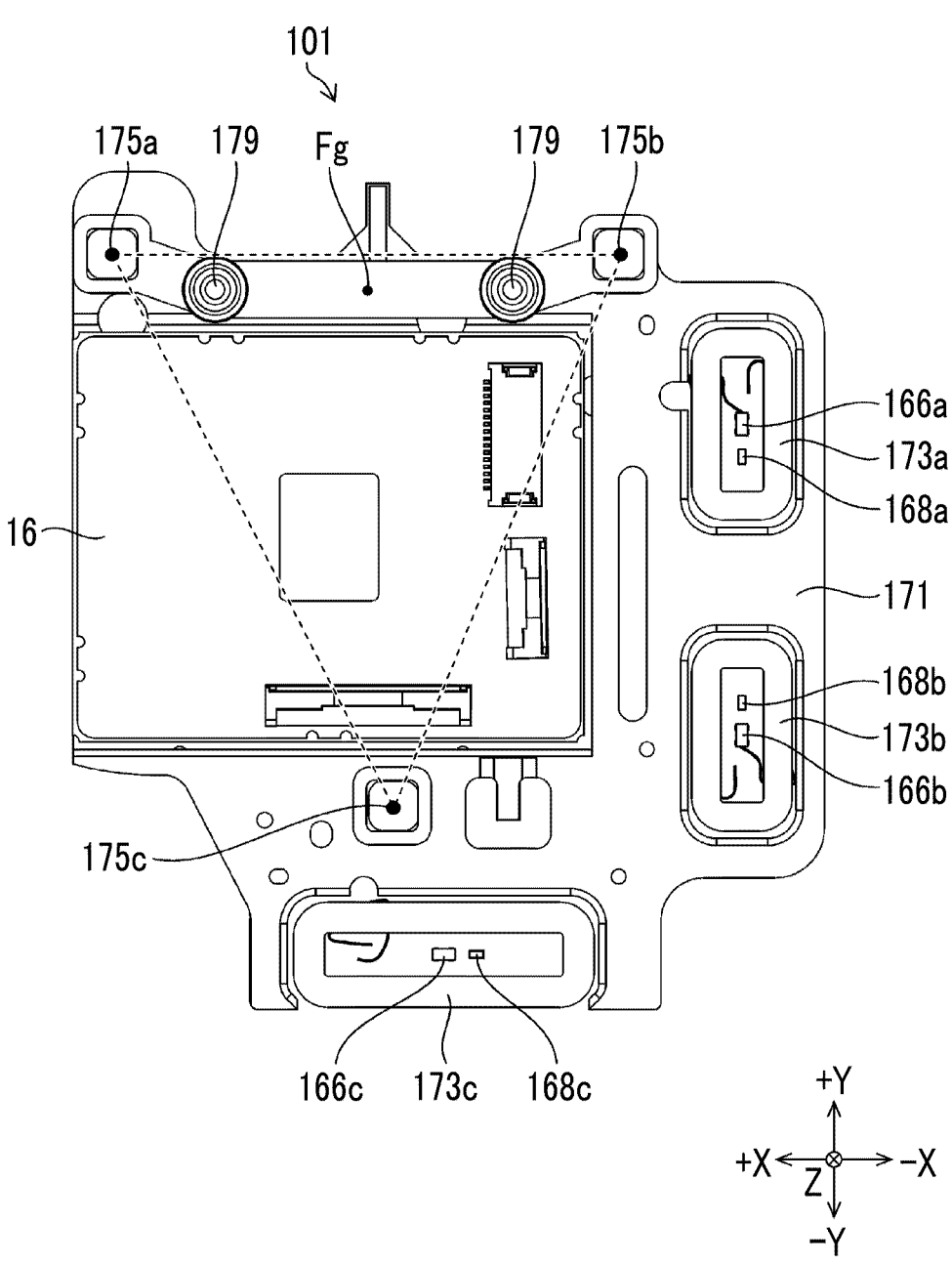
FIG. 17 is a rear view of the movable unit.

FIGS. 16 and 17 are views for explaining the ball receiving surfaces 175*a* to 175*c* and the protrusions 179. FIG. 16 is a rear perspective view of the movable unit 101, and FIG. 17 is a rear view of the movable unit 101.

As shown in FIG. 5, the protrusion 179 includes the movable unit heat radiation sheet metal 177 provided at a distal end thereof (the movable unit heat radiation sheet metal 177 is not shown in FIGS. 16 and 17). In a case of the locked state, the movable unit heat radiation sheet metal 177 is pressed by the fixed unit heat radiation sheet metal 185 in a negative direction of the Z axis. Therefore, the protrusions 179 are pulled in the negative direction of the Z axis (to the base plate 105 side of the fixed unit 111). A centroid Fg (FIG. 17) of a resultant force (Fa+Fb) of pulling forces of the protrusions 179 needs to be inside a triangle formed by the ball receiving surfaces 175*a* to 175*c* (see FIG. 17).

Here, since a holding force of the movable unit 101 in a case of being locked is determined by a product of a friction coefficient of the sheet member 183 and the pulling force, it is desirable that the pulling force (Fa+Fb) is large. Meanwhile, since this pulling force is a force that deforms the movable unit frame member 171, it is desirable that the protrusion 179 is disposed at a position as close to the ball receiving surface as possible.

The movable unit in a case of being locked is in a state of being balanced by a pressing force (indicated by Fc in the drawing) against the ball receiving surfaces 175*a* to 175*c* and the pulling force (Fa+Fb), and bending stress is generated in the movable unit frame member 171. Since an allowable amount of deformation of the movable unit frame member 171 is several µm and very small, it is desirable to dispose the movable unit frame member 171 at a position where a bending moment is suppressed in order to increase the lock holding force.

Further, the movable unit 101 of the body image stabilization (BIS) has three degrees of freedom corresponding to translation in the X direction and the Y direction, and rotation around the Z axis (optical axis L). The restriction in the X and Y directions can be performed by contact at one point. However, in order to regulate the rotation around the Z axis, in a case where two protrusions 179 are spaced apart from each other, the holding force against a load (couple) around the optical axis L can be increased.

In this example, a case where two protrusions 179 are formed has been described, but any number of (for example, one to three) protrusions can be used for support as long as the above-described requirements are satisfied.

APPENDIX

The present disclosure described above includes the inventions of the following aspects.

Aspect 1

A shake correction device comprising: a movable unit that holds an imaging element; a fixed unit that supports the movable unit to be movable within a plane that intersects an optical axis of the imaging element; and a lock mechanism that presses a first region of a first member connected to the fixed unit against a second member of the movable unit to suppress movement of the movable unit, in which heat of the movable unit is conducted to the fixed unit from a second region of the first member different from the first region via the first region from the second member by the pressing.

Aspect 2

The shake correction device according to Aspect 1, in which each of the first region and the second region is a region of an end portion of the first member.

Aspect 3

The shake correction device according to Aspect 1 or 2, in which the heat of the movable unit is heat generated by an operation of the imaging element.

Aspect 4

The shake correction device according to any one of Aspects 1 to 3, in which the first member is an elastically deformable member, and the first member is elastically deformed to press the second member in a case where the lock mechanism is operated.

Aspect 5

The shake correction device according to any one of Aspects 1 to 4, in which the lock mechanism includes an operation member that has an inclined surface movable along a plane intersecting the optical axis, the first member has a protruding portion sliding on the inclined surface, and the protruding portion slides on the inclined surface to push up the first member, and the first region presses the second member.

Aspect 6

The shake correction device according to Aspect 5, in which the protruding portion protrudes in a direction along the optical axis.

Aspect 7

The shake correction device according to Aspect 5 or 6, in which the operation member is moved by a driving unit composed of a motor and a plurality of gears, and a part of the plurality of gears is composed of a worm wheel.

Aspect 8

The shake correction device according to any one of Aspects 1 to 7, in which the lock mechanism locks the movable unit at a defined position.

Aspect 9

The shake correction device according to Aspect 8, in which the defined position is a position at which the second member is pressed in a state where an axis of an optical member and the optical axis are aligned with each other.

Aspect 10

The shake correction device according to any one of Aspects 1 to 9, in which the movable unit is biased to a fixed unit side to grip at least three balls with the fixed unit via ball receiving surfaces, and a centroid of a force acting on the second member in a case where the second member is pressed is located within a triangular region formed by the ball receiving surfaces.

Aspect 11

The shake correction device according to any one of Aspects 1 to 10, in which an elastic member having a plurality of uneven shapes on a surface thereof is disposed in the first region, and the second member is pressed via the elastic member.

Aspect 12

The shake correction device according to any one of Aspects 1 to 11, in which an elastic member having a plurality of uneven shapes on a surface thereof is disposed in a region of the second member, which comes into contact with the first region, and the second member is pressed via the elastic member.

Aspect 13

The shake correction device according to any one of Aspects 1 to 12, in which a heat radiation gel is disposed in at least a part of the first region.

Aspect 14

An imaging apparatus equipped with the shake correction device according to any one of Aspects 1 to 13.

Although examples of the present invention have been described above, it goes without saying that the present invention is not limited to the above-described embodiment, and various modifications can be made without departing from the scope of the present invention.

EXPLANATION OF REFERENCES

2: imaging apparatus main body
10: imaging apparatus
16: imaging element
100: shake correction device
101: movable unit
103: facing yoke
105: base plate
105a: opening
111: fixed unit
121: lock driving unit
131: DC motor
135: FPC
151: lock lever
153: wedge-shaped portion
159: lock operation unit
163: contact unit
171: movable unit frame member
177: movable unit heat radiation sheet metal
179: protrusion
181: graphite sheet
183: sheet member
185: fixed unit heat radiation sheet metal
185a: protruding portion
185b: first region
185c: second region
187: sheet metal fixing portion
191: cushion
201: lock mechanism

What is claimed is:

1. A shake correction device comprising:
a movable unit that holds an imaging element;
a fixed unit that supports the movable unit to be movable within a plane that intersects an optical axis of the imaging element; and
a lock mechanism that presses a first region of a first member connected to the fixed unit against a second member of the movable unit to suppress movement of the movable unit, wherein heat of the movable unit is conducted to the fixed unit from a second region of the first member different from the first region via the first region from the second member by the pressing,
wherein the lock mechanism includes an operation member that has an inclined surface movable along a plane intersecting the optical axis,
the first member has a protruding portion sliding on the inclined surface, and
the protruding portion slides on the inclined surface to push up the first member, and the first region presses the second member.

2. The shake correction device according to claim 1, wherein each of the first region and the second region is a region of an end portion of the first member.

3. The shake correction device according to claim 1, wherein the heat of the movable unit is heat generated by an operation of the imaging element.

4. The shake correction device according to claim 1, wherein the first member is an elastically deformable member, and
the first member is elastically deformed to press the second member in a case where the lock mechanism is operated.

5. The shake correction device according to claim 1, wherein the protruding portion protrudes in a direction along the optical axis.

6. The shake correction device according to claim 1, wherein the operation member is moved by a driving unit composed of a motor and a plurality of gears, and
a part of the plurality of gears is composed of a worm wheel.

7. The shake correction device according to claim 1, wherein the lock mechanism locks the movable unit at a defined position.

8. The shake correction device according to claim 7, wherein the defined position is a position at which the second member is pressed in a state where an axis of an optical member and the optical axis are aligned with each other.

9. The shake correction device according to claim 1, wherein the movable unit is biased to a fixed unit side to grip at least three balls with the fixed unit via ball receiving surfaces, and
a centroid of a force acting on the second member in a case where the second member is pressed is located within a triangular region formed by the ball receiving surfaces.

10. The shake correction device according to claim 1, wherein an elastic member having a plurality of uneven shapes on a surface thereof is disposed in the first region, and the second member is pressed via the elastic member.

11. The shake correction device according to claim 1, wherein an elastic member having a plurality of uneven shapes on a surface thereof is disposed in a region of the second member, which comes into contact with the first region, and the second member is pressed via the elastic member.

12. The shake correction device according to claim 1, wherein a heat radiation gel is disposed in at least a part of the first region.

13. An imaging apparatus comprising:
the shake correction device according to claim 1.

* * * * *